United States Patent [19]
Hills

[11] 3,772,507
[45] Nov. 13, 1973

[54] VISUAL DISPLAY METHOD AND APPARATUS

[75] Inventor: Brian Leslie Hills, Elwood, Victoria, Australia

[73] Assignee: Australian Road Research Board, Kew, Victoria, Australia

[22] Filed: Aug. 4, 1971

[21] Appl. No.: 168,992

[52] U.S. Cl. ............................................. 240/2 R
[51] Int. Cl. ........................................... F21v 33/00
[58] Field of Search ............... 240/2 R, 2 AD, 2 AT; 40/130 A, 130 B

[56] References Cited
UNITED STATES PATENTS
2,232,110  2/1941  Gruenhut .......................... 40/130 B Primary Examiner—Donald O. Woodiel
Attorney—Cushman, Darby & Cushman

[57] ABSTRACT

Apparatus comprising a partially reflective mirror, a light source and a background for displaying articles against the background wherein the light source illuminates the article from the front and another light source illuminates the background, the article being viewed directly and the background being viewed as a reflection from the partially reflective mirror.

10 Claims, 2 Drawing Figures

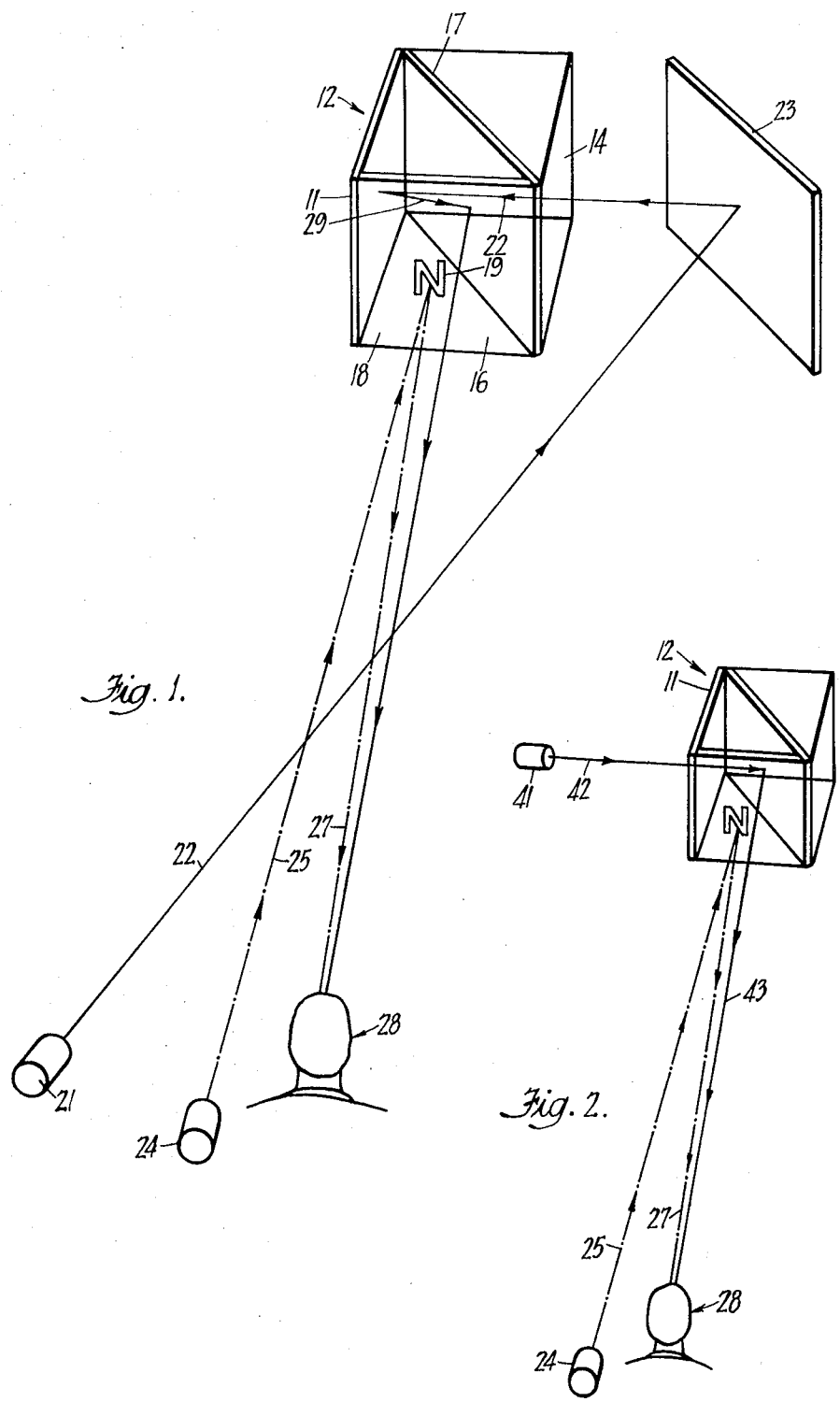

VISUAL DISPLAY METHOD AND APPARATUS

BACKGROUND OF THE INVENTION

FIELD OF THE INVENTION

This invention relates to a method of visually displaying an object against a background and to an apparatus for visual display, which apparatus may be arranged to carry out the method.

An object of the invention, in its narrower sense, is to provide means enabling the relative luminance or colour contrast between an object, which is viewed against a background, and the background to be varied by simple variation of incident light upon the object or background.

BRIEF SUMMARY OF THE INVENTION

According to a first aspect of the invention there is provided a visual display apparatus comprising a background, a partially light reflective, partially light transmissive element and a light source, said element and said light source being positioned relative to said background such that, in use of the apparatus, the background is viewable as a reflection from said element and said light source directs light to illuminate, by direct lighting, an object placed in the path of light from said background and reflected in said element, the illumination being on the opposite side of said object to the side thereof lit by the light from the background reflected by said element and said light source also being positioned so as not to light said background either directly or by light transmitted through said element.

According to a second aspect of the invention there is provided a method of visually displaying a foreground object against a background, the method comprising the steps of positioning a partially light reflective, partially light transmissive element relative to said background such that the background is viewable as a reflection from said element, placing said object in the path of light from said background and reflected in said element, positioning a light source to directly illuminate said object on the opposite side thereof to the side lit by the light from said background reflected by said element, but not to light said background either directly or by light transmission through said element.

Normally the said element will be arranged to reflect up to about 30 percent of incident light.

BRIEF DESCRIPTION OF THE SEVERAL VIEWS OF THE DRAWING

The invention may be better understood from the following description of a representative embodiment which is to be read in conjunction with the accompanying drawings in which:

FIG. 1 is a diagrammatic representation of one embodiment of apparatus constructed in accordance with the invention, and FIG. 2 is a diagrammatic representation of another embodiment of apparatus constructed in accordance with the invention.

DETAILED DESCRIPTION

FIG. 1 shows a reflective background 11 arranged in a light box 12. The background is planar and extends along one internal wall of the box. A wall 14, opposite background 11, is open as is another wall or window 16 adjacent the background. A partially reflective, partially transmissive mirror 17 is disposed in box 12. It extends in a plane disposed at about 45° to the background 11 and diagonally across box 12.

Mirror 17 has a light transmittance of about 90 percent and a light reflectance of about 10 percent.

A transparent screen 18 is disposed in open wall 16 and objects to be displayed against background 11 are positioned on the screen. The objects comprise, in this case, the letter "N" designated by reference numeral 19. Letter 19 is at least substantially opaque and the sides thereof facing outwardly are at least partially reflective.

A background illumination light source 21 is arranged to light background 11. As represented by light ray 22, light from source 21 is reflected by a mirror 23 (of high reflectance) into box 12 via open wall 14 and onto mirror 17. Because of the high transmittance of mirror 17 most of the light from source 21 passes through mirror 17 to light background 11.

Of the light reaching screen 11, and reflected therefrom onto mirror 17, a small portion is reflected back through screen 18, as indicated by ray 29 and ray 26 so that a viewer 28, positioned in front of screen 18, sees the background by reflection from mirror 17. Most of the light reflected from background 11 onto mirror 17 passes therethrough and is lost from the optical system.

A foreground illumination light source 24 adjacent viewer 28 is arranged to direct light onto screen 18. Part of this light is reflected by letter 19, as indicated by rays 25, 27 so that viewer 28 will be able to view the letter by reflected light.

The remainder of the light from source 24 passes through screen 18 and onto mirror 17. Because of the low reflectance of mirror 17 a small part only of this light is directed onto screen 11. Most of the light from source 24 and incident upon mirror 17 passes through the mirror and is lost from the optical system. Most of the light from source 24 which is reflected by background 11 back onto mirror 17 is transmitted through the mirror and lost to the system so that only a very small fraction indeed of light from source 24 is returned to viewer 28.

It will be appreciated that viewer 28 will see letter 19 as being superimposed upon background 11. If the intensity of light source 24 is varied, the amount of light reflected to viewer 28 from letter 19 will vary in a substantially direct one-to-one relationship. However, because only little light from source 24 reaches screen 11 and is reflected back to the viewer, the variation will not cause a very significant variation in intensity of illumination of the background as seen by the viewer. Thus, it is possible to vary the illumination of letter 19 over a wide range simply by varying the intensity of light source 24, to alter the illumination contrast ratio between the background 11 135 letter 19. A similar variation could be effected by variation of the intensity of source 21.

By suitable selection of the intensity of illumination from source 21 or from source 24, it is possible to select any of a range of different contrast ratios. The range may extend between a value corresponding to a relatively dark background and a value corresponding to a relatively light background, with a median value at which there is no contrast between the letter and background. "Positive" and "negative" images of letter 19 are readily obtainable.

The above apparatus is designed to allow comparison of legibility of letter 19 against background 11 for different contrasts between these. The letter and the background may be formed, for example, from highly reflective, retro-reflective material.

It is to be understood that the apparatus is not limited only to the above use and furthermore, if desired, modifications may be made to the arrangement. Particularly, the background 11 could be illuminated by means other than source 21 and mirror 23. For example, FIG. 2 shows an arrangement in which screen 11 is illuminated by back projection from a source 41 external to box 12 as indicated by light rays 42, 43. Again, whilst two light sources 21, 24 are used, these could be replaced by a single source, using suitable mirrors to derive the necessary light beams. Further, the mirror 17 may have transmittance/reflectance ratios other than the 9:1 described. Lower transmittance values will give superior constancy of illumination of the background when the foreground illumination is varied, but will reduce the optical efficiency of the arrangement. Higher reflectances will increase the interdependence of the background and foreground illuminations. It has been found that a mirror having the described reflectance characteristics provides a satisfactory compromise, the variation of background illumination with varying foreground illumination being visually imperceptable over a wide range of variation in foreground illumination.

The invention provides a simple means for enabling the contrast between an object and a background to be selected and/or varied as desired. The object and background may be of any shape, size or colour. There may also be as many objects as desired, and substitution of different objects on screen 18 may be accomplished with ease.

The above and many other modifications may be made to the invention without departing from the spirit and scope thereof as defined in the appended claims.

I claim:

1. Visual display apparatus comprising a partially light reflective, partially light transmissive surface, a background, means defining an observation window and including means for supporting an object in the window, and a light source, the observation window and the partially reflective surface being angularly disposed relative to one another and the source of light being disposed relative to the observation window to directly illuminate an object supported in the observation window before impinging on the partially reflective surface, and means to illuminate the background, the background being disposed on the same side of said partially reflective surface as said window and being disposed at angles to said surface and to said window such that light from the background impinges upon the partially reflective surface and is reflected through the observation window.

2. Visual display apparatus as claimed in claim 1 wherein the background, observation window and the surface are disposed relative to one another so that each respectively lies upon a side of a triangle and the light source is disposed outside said triangle.

3. Visual display apparatus as claimed in claim 2 wherein said means for illuminating said background comprises a second light source positioned to direct light onto said background through said surface.

4. Visual display apparatus as claimed in claim 3 including a light box having four walls arranged in generally rectangular configuration when viewed in plan, wherein said background is defined by one of said walls, a second one of said walls, adjacent said background, being transparent and constituting said observation window and being provided with means for holding said object, said surface extending diagonally across said light box and from edges of said background and said second wall remote from an edge of said light box defining the junction between these.

5. Visual display apparatus as claimed in claim 4 wherein mirror means is provided to direct light from said second light source through said surface.

6. Visual display apparatus as claimed in claim 4 wherein said surface is approximately 90 percent transmissive and 10 percent reflective.

7. Visual display apparatus as claimed in claim 2 wherein said means for illuminating said background comprises a second light source disposed outside said triangle to direct light onto said background, and without first passing through said surface.

8. Visual display apparatus as claimed in claim 7 including a light box and having four walls arranged in generally rectangular configuration when viewed in plan, wherein said background is defined by one of said walls a second one of said walls, adjacent said background, being transparent and constituting said observation window and being provided with means for holding said object, said surface extending diagonally across said light box and from edges of said background and said second wall remote from an edge of said light box defining the junction between these.

9. A method of visually displaying to an observer a foreground object against background light, the method comprising the steps of positioning a partially light reflective, partially light transmissive surface in a position to be viewed by the observer and at an angle to a background such that light from the background is reflected from said surface toward the observer, placing said object in the path of said light which is reflected from said surface, positioning a light source to directly illuminate said object on the opposite side thereof to the side lit by said light reflected from said surface, but not to light said background either directly or by light transmission through said surface.

10. A method as in claim 9 including illuminating said background.

* * * * *

UNITED STATES PATENT OFFICE
CERTIFICATE OF CORRECTION

Patent No. 3,772,507            Dated November 13, 1973

Inventor(s) Brian L. Hills

It is certified that error appears in the above-identified patent and that said Letters Patent are hereby corrected as shown below:

Column 2, line 55, delete "135" and insert --and--

Signed and sealed this 27th day of August 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,772,507         Dated  November 13, 1973

Inventor(s) Brian L. Hills

It is certified that error appears in the above-identified patent and that said Letters Patent are hereby corrected as shown below:

In the heading:

Please add:

-- [30]  Foreign Application Priority Data

August 5, 1970    Australia........PA 2075/70  --

Signed and sealed this 4th day of February 1975.

(SEAL)
Attest:

McCOY M. GIBSON JR.                C. MARSHALL DANN
Attesting Officer                  Commissioner of Patents